B. FISHER.
FRUIT TREE PROP.
APPLICATION FILED JAN. 14, 1909.
921,215.
Patented May 11, 1909.
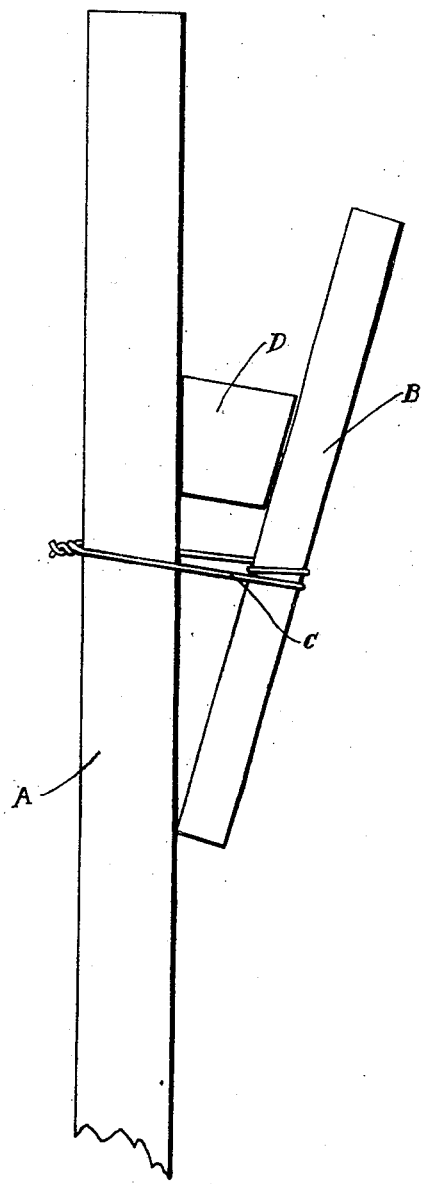
Witnesses:
Inventor

UNITED STATES PATENT OFFICE.

BLUER FISHER, OF ANAHEIM, CALIFORNIA.

FRUIT-TREE PROP.

No. 921,215.  Specification of Letters Patent.  Patented May 11, 1909.

Application filed January 14, 1909. Serial No. 472,293.

*To all whom it may concern:*

Be it known that I, BLUER FISHER, a citizen of the United States, residing at Anaheim, in the county of Orange and State of California, have invented a new and useful Fruit-Tree Prop, of which the following is a specification.

My invention relates to improvements in fruit tree props fitted with adjustable hooks, and the objects of my improvement are, first, to provide a hook that does not injure the tree; and second to provide a hook considerably cheaper than any now in use.

I attain these objects by the mechanism illustrated in the accompanying drawing, in which the figure is a view of a prop fitted with the adjustable hook.

A is a prop the bottom of which rests on the ground when in use.

B is a strip of wood connected with A by the wire C which is tightly wound around B then fastened around A, leaving sufficient space for the insertion of D, substantially as shown in the drawing.

D is a block of wood inserted between A and B and is used to support the limb of the tree.

To adjust the hook the block D is removed, the strip B moved to any desired height on the prop A, when D is inserted and the limb to be propped is rested on D between A and B.

I am aware that prior to my invention fruit tree props fitted with adjustable hooks have been made. I therefore do not claim such a combination broadly; but

I claim:

The combination, with a prop, of a wooden strip, a wire wound around the strip then fastened around the prop, and a wooden block inserted between the strip and the prop, substantially as specified, for the purpose set forth.

BLUER FISHER.

Witnesses:
 FRED C. SPENCER,
 EARL C. DUTTON.